(12) United States Patent
Edwards et al.

(10) Patent No.: US 12,159,272 B2
(45) Date of Patent: Dec. 3, 2024

(54) SYSTEM, METHOD, AND COMPUTER-ACCESSIBLE MEDIUM FOR DETECTING AND REMEDIATING IN-PERSON CART ABANDONMENT

(71) Applicant: Capital One Services, LLC, McLean, VA (US)

(72) Inventors: Joshua Edwards, Midlothian, VA (US); Lukiih Cuan, Washington, DC (US); Latika Gulati, Annandale, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 432 days.

(21) Appl. No.: 16/995,114

(22) Filed: Aug. 17, 2020

(65) Prior Publication Data

US 2022/0051214 A1 Feb. 17, 2022

(51) Int. Cl.
*G06Q 20/20* (2012.01)
*G06N 20/00* (2019.01)
(Continued)

(52) U.S. Cl.
CPC ........... *G06Q 20/201* (2013.01); *G06N 20/00* (2019.01); *G06Q 20/202* (2013.01); *G06Q 20/203* (2013.01); *G06Q 20/208* (2013.01); *G06Q 30/0206* (2013.01); *G06V 20/41* (2022.01); *G06V 40/161* (2022.01);
(Continued)

(58) Field of Classification Search
None
See application file for complete search history.

(56) References Cited

U.S. PATENT DOCUMENTS 6,233,564 B1 5/2001 Schulze, Jr.
7,072,858 B1 7/2006 Litzow et al.
(Continued)

FOREIGN PATENT DOCUMENTS

AU 2017219111 A1 9/2017
CA 2470239 A1 10/2003
(Continued)

*Primary Examiner* — Chesiree A Walton
(74) *Attorney, Agent, or Firm* — HUNTON ANDREWS KURTH LLP

(57) ABSTRACT

An exemplary system, method, and computer-accessible medium for determining product abandonment for an item(s) can include receiving first information related to a plurality of in-person transactions for a plurality of customers from a point of sale (POS) device(s) located at a merchant(s), where the first information can include transaction information related to the item(s), determining second information related to a reduction of a quantity of the item(s) from the first information by an operator(s) of the POS device(s), generating third information by identifying particular transactions that include the reduction of the quantity, and determining the product abandonment based on the third information by applying (i) a pattern recognition procedure or (ii) a machine learning procedure to the third information. The first information can include in-person transactions that occurred over a particular period of time, and the particular period of time can correspond to a sales cycle of the merchant(s).

20 Claims, 10 Drawing Sheets

(51) Int. Cl.
*G06Q 30/0201* (2023.01)
*G06V 20/40* (2022.01)
*G06V 40/16* (2022.01)
*H04W 4/029* (2018.01)
*H04W 84/12* (2009.01)

(52) U.S. Cl.
CPC ............ *H04W 4/029* (2018.02); *G06V 20/44* (2022.01); *H04W 84/12* (2013.01)

(56) References Cited

U.S. PATENT DOCUMENTS

| | | | |
|---|---|---|---|
| 7,337,128 | B2 | 2/2008 | Banerjee et al. |
| 10,282,852 | B1 * | 5/2019 | Buibas ................ G06T 7/246 |
| 11,188,840 | B1 * | 11/2021 | Rivera ............. G06F 16/9535 |
| 11,526,665 | B1 * | 12/2022 | Hovsepian ........... G06F 40/237 |
| 2001/0014868 | A1 | 8/2001 | Herz et al. |
| 2006/0053132 | A1 | 3/2006 | Litzow et al. |
| 2008/0021885 | A1 | 1/2008 | Jones |
| 2008/0077487 | A1 | 3/2008 | Davis et al. |
| 2008/0154694 | A1 | 6/2008 | Litzow et al. |
| 2009/0177480 | A1 | 7/2009 | Chen et al. |
| 2012/0116878 | A1 | 5/2012 | Falk et al. |
| 2013/0170541 | A1 * | 7/2013 | Pace ..................... G06T 9/001 375/240.02 |
| 2013/0268328 | A1 | 10/2013 | Kurapati et al. |
| 2014/0067478 | A1 | 3/2014 | Zenor |
| 2014/0222530 | A1 | 8/2014 | Wegner et al. |
| 2014/0278883 | A1 * | 9/2014 | Wang ................ G06Q 30/0225 705/14.26 |
| 2015/0029339 | A1 * | 1/2015 | Kobres ................. H04N 7/181 348/150 |
| 2016/0042315 | A1 * | 2/2016 | Field-Darragh ..... H04B 5/0062 705/28 |
| 2016/0055498 | A1 | 2/2016 | Wang et al. |
| 2016/0253686 | A1 | 9/2016 | Roberts et al. |
| 2017/0004487 | A1 * | 1/2017 | Hagen ............... G06Q 20/4016 |
| 2017/0236143 | A1 | 8/2017 | Code et al. |
| 2017/0262874 | A1 | 9/2017 | Pandey et al. |
| 2018/0075470 | A1 | 3/2018 | Montero et al. |
| 2019/0147393 | A1 * | 5/2019 | McCafferty ........... G06V 20/52 340/572.1 |
| 2020/0265586 | A1 * | 8/2020 | Yang ....................... G06T 7/97 |

FOREIGN PATENT DOCUMENTS

| | | |
|---|---|---|
| CA | 2934019 A1 | 1/2017 |
| EP | 2933771 A1 | 10/2015 |
| WO | 1999033012 A1 | 7/1999 |
| WO | 2009094581 A1 | 7/2009 |
| WO | 2009122243 A1 | 10/2009 |

* cited by examiner

SYSTEM, METHOD, AND COMPUTER-ACCESSIBLE MEDIUM FOR DETECTING AND REMEDIATING IN-PERSON CART ABANDONMENT

FIELD OF THE DISCLOSURE

The present disclosure relates generally to in-person cart abandonment, and more specifically, to exemplary embodiments of an exemplary system, method, and computer-accessible medium for detecting and remediating in-person cart abandonment.

BACKGROUND INFORMATION

When a customer shops on the internet, it is common for the customer to place many items in their online shopping cart for potential purchase. The customer then either purchases the entire list of items in the cart, removes some items from the cart and purchases the rest, or does not purchase any items in the cart, thus abandoning the transaction. E-commerce systems constantly track items that have been placed in a customer's cart, as well as whether a customer has actually purchased the item, or whether the customer has abandoned the item. Armed with knowledge of this online cart abandonment, the merchant can take certain steps to remediate this abandonment. However, in brick and mortar stores, the detection of cart abandonment is much more difficult as it can be difficult to determine if a customer has placed an item in their physical cart and then removed it. Even more difficult is when a customer evaluates an item before actually placing it in their physical cart, but ultimately does not purchase the item.

Thus, it may be beneficial to provide an exemplary system, method, and computer-accessible medium for detecting and remediating in-person cart abandonment, which can overcome at least some of the deficiencies described herein above.

SUMMARY OF EXEMPLARY EMBODIMENTS

An exemplary system, method, and computer-accessible medium for determining product abandonment for an item(s) can include receiving first information related to a plurality of in-person transactions for a plurality of customers from a point of sale (POS) device(s) located at a merchant(s), where the first information can include transaction information related to the item(s), determining second information related to a reduction of a quantity of the item(s) from the first information by an operator(s) of the POS device(s), generating third information by identifying particular transactions that include the reduction of the quantity, and determining the product abandonment based on the third information by applying (i) a pattern recognition procedure or (ii) a machine learning procedure to the third information. The first information can include in-person transactions that occurred over a particular period of time, and the particular period of time can correspond to a sales cycle of the merchant(s).

In some exemplary embodiments of the present disclosure, the reduction of the quantity can be (i) a return of the item(s) or (ii) or a removal of the item(s) from a transaction prior to completing the transaction. The third information can be generated by flagging particular transactions that include the return of the item(s) where the return took place within a particular period of time after a purchase of the item(s). The particular period of time can be less than about 60 minutes. A flag from employee(s) of transaction(s) can be received that can include the item(s) and the third information can be generated based on the flag. Action(s) recommendation can be generated based on the product abandonment, which can include (i) fixing a pricing error for the item(s), (ii) retraining employee(s) on the item(s), (iii) decreasing a number of inventory orders for the item(s), or (iv) identifying a product defect associated the item(s).

In certain exemplary embodiments of the present disclosure, a plurality of further transactions that include the item(s) can be identified, a price adjustment can be automatically provided to each customer associated with each of the further transactions based on the product abandonment, and each customer can be notified regarding the price adjustment. The POS(s) device can include a plurality of POS devices located in a plurality of different stores associated with a single merchant.

Additionally, an exemplary system, method, and computer-accessible medium for determining product abandonment for item(s), can include receiving video(s)feed from camera(s) located in store(s), tracking individual(s) in the store(s) using the video(s)feed, determining abandonment information, where the determining of the abandonment information can include, determining if the individual(s) picked up item(s) based on the tracking, determining if the individual(s) subsequently put down the item(s) based on the tracking, and determining a time elapsed between when the individual(s) picked up the item(s) and when the individual(s) put down the item(s), and determining the product abandonment by applying a (i) a pattern recognition procedure or (ii) a machine learning procedure to the abandonment information. A first location can be determined where the individual(s) picked up the item(s) and a second location can be determined where the individual(s) put down the item, a distance between the first location and the second location can be determined, and the product abandonment can be determined based on the distance.

In some exemplary embodiments of the present disclosure, a determination can be made as to whether individual(s) checked a price of the item(s) using a scanner; a first price indicated by the scanner can be matched to a second price on a tag at a shelf location associated with the item(s), and the product abandonment can be determined based on a price difference between the first price and the second price. A determination can be made as to (i) whether the individual(s) checked a price of the item(s) at a competitor(s), while in the store(s), using a mobile device associated with the individual(s), and (ii) the price of the item(s) at the competitor(s), and an indication can be provided to the individual(s) of a price match by the store(s) with the competitor(s). The indication can be provided (i) by sending a notification to the mobile device or (ii) by changing a digital price at a shelf location associated with the item(s) while the individual(s) is near the shelf location. A determination can be made as to whether the individual(s) is completing a transaction at a point of sale device that includes the item(s), and the price of the item(s) can be automatically adjusted based on the price match.

In certain exemplary embodiments of the present disclosure, the individual(s) can be tracked using facial recognition. A Wi-Fi request can be received from the individual(s) for network access to a mobile device associated with the individual(s), access to the mobile device to Wi-Fi associated with the store(s) can be granted, and the individual(s) can be tracked using the mobile device. A price of the item(s) can be automatically changed based on the product abandonment or (ii) future orders for the item(s) can be cancelled based on the product abandonment.

Further, an exemplary system, method, and computer-accessible medium for updating a transaction(s) can include receiving first information related to a scan of an item at a point sale device, receiving an indication that a first price displayed for the item at the point of sale device is incorrect, accessing a video feed for a location that can include a store location where the item is displayed, determining a shelf location for the item, automatically determining a second price for the item that is displayed at the shelf location, and updating the transaction(s) based on the second price.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

In-person cart abandonment is a significant issue for brick and mortar stores. In order to alleviate in-person cart abandonment, the exemplary system, method, and computer-accessible medium can analyze customer behavior, including the behavior of customers that do and do not abandon items in person, to determine the cause for the abandonment, and how to prevent it. For example, the exemplary system, method, and computer-accessible medium can utilize information regarding when a customer adds an item to their physical cart, but then does not purchase the item, to determine a potential issue with the item, the store, or an employee at the store. In particular, information regarding the return or void of an item can be used to determine the potential issue.

Figure 1:
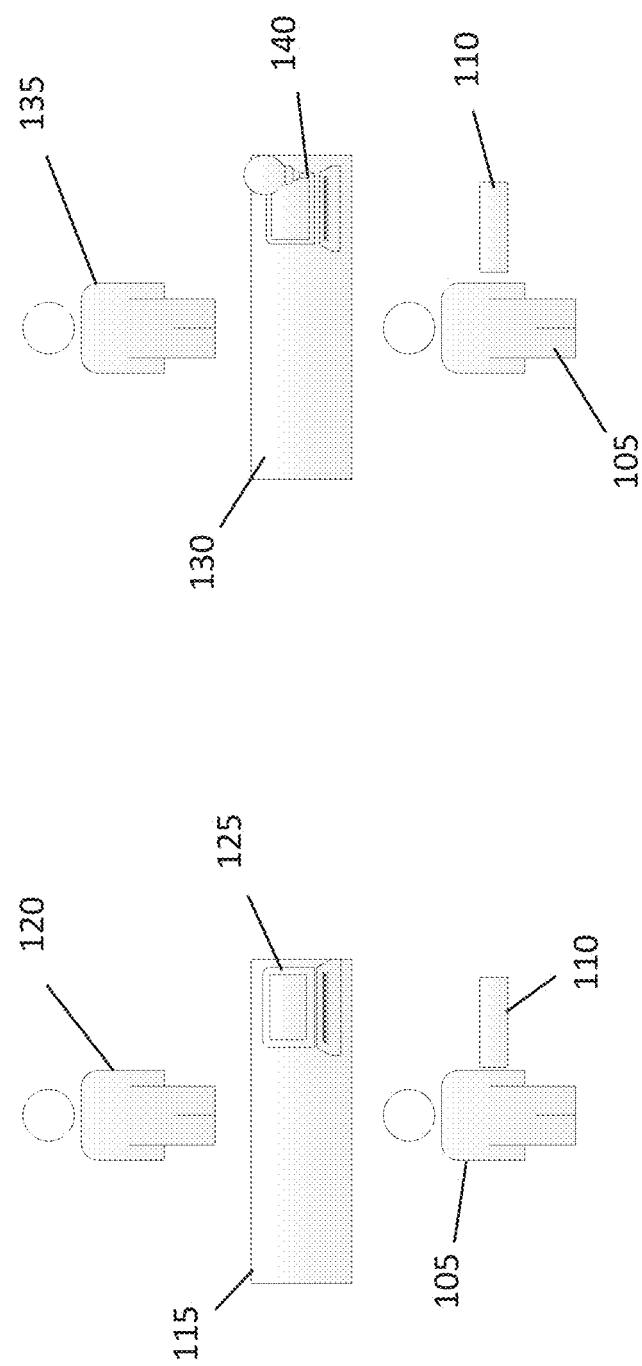
FIG. 1 is an exemplary diagram of a customer purchasing and then returning an item according to an exemplary embodiment of the present disclosure.

As shown in FIG. 1, in-person cart abandonment can be based on the return or price adjustment after an item has been purchased. For example, customer 105 is purchasing item 110. Customer 105 brings item 110 to a checkout counter 115. An employee 120 uses a point of sale device 125 to ring up item 110. After customer 105 purchases item 110, they may determine that there is an issue with item 110. This can take place within minutes after purchase, or days or weeks after the purchase. After customer 105 determines that there is an issue, they return to the store, specifically to a customer service counter 130. At customer service counter 130, a customer service representative 135 returns item 110 using a further point of sale device 140. Return or price adjustment information for a particular item can be maintained and aggregated (e.g., over a particular sales cycle associated with the store). If a threshold number of returns or price adjustments is determined, then the exemplary system, method, and computer-accessible medium can determine that there may be a problem with the item, or the pricing of the item, as discussed below. For example, as discussed below, the time that has elapsed between the purchase of the item and the return of the item can indicate cart abandonment, as well as the reason for the cart abandonment.

Figure 2:
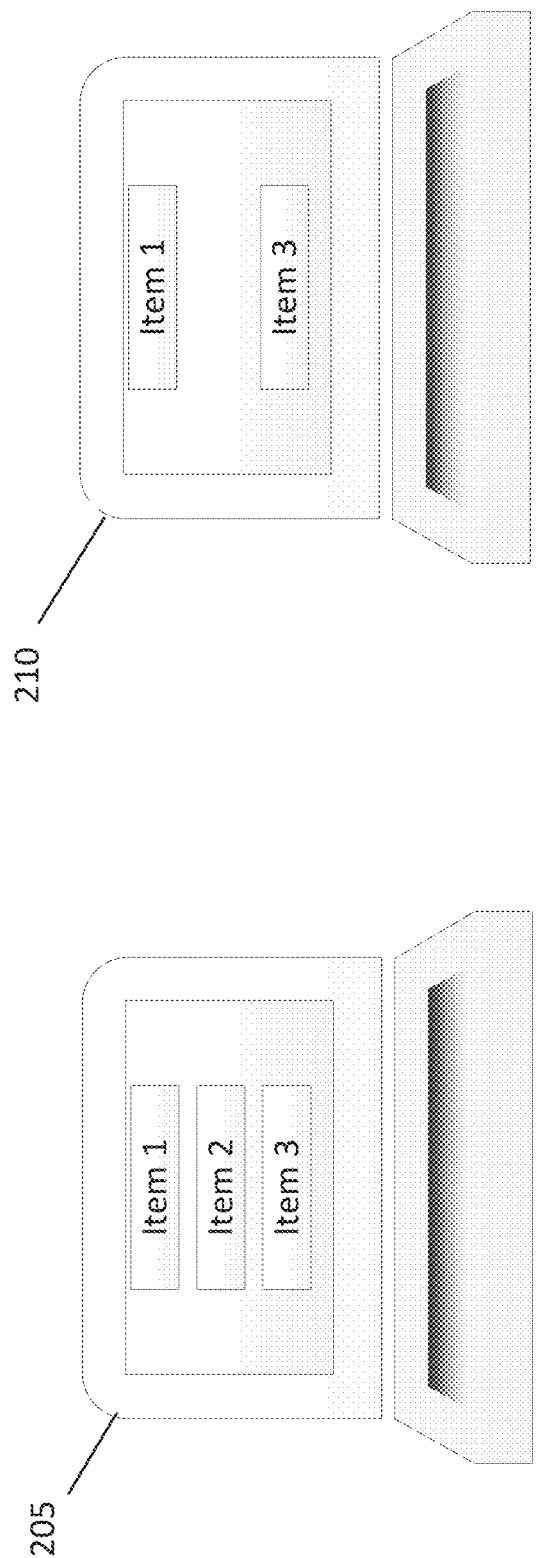
FIG. 2 is an exemplary diagram illustrating the voiding of an item according to an exemplary embodiment of the present disclosure.

In person cart abandonment can also occur at the time of sale (e.g., prior to the purchasing of the item). For example, as shown in FIG. 2, an indication of cart abandonment can occur if an item is scanned, but then voided off of the transaction prior to being purchased. For example, when a customer purchases multiple items, each item is scanned into a point of sale device (e.g., item 1, item 2, and item 3, shown as being rung up by element 205). As shown by element 210, item 2 has been voided from the transaction, which can indicate a particular type of cart abandonment.

Additionally, the editing of the price of the item during purchase can also indicate a problem with the item. If an item is consistently edited (e.g., the price of the item is adjusted) at the point of sale, or if it is consistently removed from the sale prior to purchase, the exemplary system, method, and computer-accessible medium can flag the item as potentially being a problem item (e.g., based on the price at the store being incorrect). As discussed below, information regarding item returns, price adjustments, item voids, or item editing can be input into a machine learning procedure or a pattern recognition procedure to determine or detect an anomaly with the item. The anomaly can include incorrect pricing at the point of sale, incorrect pricing on the item itself (e.g., on the item packaging or where the item is located), lower competitor prices, or an employee providing incorrect information about the item.

Once an anomaly has been detected or determined by the exemplary system, method, and computer-accessible medium, an action can be taken with respect to the item. The action can be recommended by an employee, or the recommended action can be provided by the exemplary system, method, and computer-accessible medium. The action can be proactive and/or responsive. A proactive action can include fixing a pricing error with the item (e.g., by manually or automatically setting the correct price of the item). Information about the action can also be automatically sent to one or more managers at the store. Other actions can include training or retraining of employees (e.g., if the abandonment is the result of incorrect information being provided by one or more employees), decreasing the number of the item in inventory, decreasing future orders of the item, and/or identifying a product defect with the item. Reactive actions can include providing notifications to customers (e.g., based on credit card information, loyalty accounts, etc.) about a price reduction or store credit. For example, a customer may not have realized that a pricing mistake has occurred. The exemplary system, method, and computer-accessible medium can automatically notify the customer that the pricing mistake has been identified and automatically corrected on their behalf.

In-person cart abandonment can be the result of an item being rung up incorrectly. However, in-person cart abandonment can also be the result of some unknown factors in the store itself. Examples can include the condition of the store (e.g., how dirty or clean to store is), staffing levels (e.g., too few staff helping customer or checking people out). While information about abandonment for a particular item can be difficult to determine, information about conditions in the store can be even more difficult. Thus, instead of relying on only information obtained at the point of sale, other information can be used to determine this type of cart abandonment. For example, video tracking can be used, as discussed below. Additionally, information about items scanned at a price checking device can be used. In particular, if a price checking device scans particular items throughout the day, but there are few, if any, transactions that actually include the price-checked item, this can indicate different types of cart abandonment (e.g., abandonment due to the items themselves, or abandonment because of conditions in the store).

Exemplary Time of Return/Price Adjustment

The time between when the customer purchased an item and when the customer returned the item can be used to determine the abandonment by the customer. For example, a long return time (e.g., a long time between purchase and return) can indicate one type of problem whereas a short return time (e.g., a short time between purchase and return) can indicate a different type of problem. A long return time can indicate, for example, that there is a problem with the item itself (e.g., it is broken or does not function well or correctly), as well as buyer's remorse. If a product has a defect in the manufacturing, or does not function properly, it is unlikely that the customer will be aware of this problem at the time of purchase. It can take a particular amount of time for the defect, or non-function, to be apparent to the customer. If a particular item is consistently returned based on the defect or non-function, this information can be aggregated and provided to the inventory purchaser, as well as to the manufacturer. The inventory purchaser can cease purchasing of the item due to the defect or non-function of the item. Additionally, the information can be input into a machine learning procedure, as discussed below, and the purchasing of the item can be automatically updated based on the defect or non-function (e.g., the exemplary system, method, and computer-accessible medium can automatically decrease the number of the item being purchased, or cease purchasing of the item altogether).

A long return time can also indicate buyer's remorse (e.g., that after the customer has had an opportunity to review their purchase, they elected to return the item). There can be many reasons for buyer's remorse. However, the price of the item can play a significant role in a customer's buyer's remorse. The exemplary system, method, and computer-accessible medium can determine that the reason for the return is buyer's remorse and attempt to alleviate the remorse (e.g., by lowering the price of the item). Information about the customer can be used to determine if the customer is likely to have buyer's remorse. This can be based on the behavior of similar customers (e.g., customers that have similar features). For example, if the exemplary system, method, and computer-accessible medium has determined that a certain customer type is likely to have buyer's remorse, then the exemplary system, method, and computer-accessible medium can automatically put in place certain actions to alleviate buyer's remorse for a particular similar customer. For some customer's, the action can be taken at the time of purchase. For example, based on the item being purchased, and the information regarding the customer, the exemplary system, method, and computer-accessible medium can automatically lower the price of the item at the time of sale. The reduction in price can also be based on the customer type. In particular, certain customer types may respond to small reductions in price, while other customer types may only respond to larger reductions in price. Thus, the exemplary system, method, and computer-accessible medium can tailor the price reduction to the specific customer purchasing the item.

Figure 3:
FIG. 3 is a set of graphs illustrating the price reduction versus time since purchase for two customers according to an exemplary embodiment of the present disclosure.

The action can also be taken after the sale has taken place, but before the expiration of a return period. For example, the time elapsed since the time of sale can indicate whether or not a customer is likely to have buyer's remorse, and how much of a reduction price may be needed to alleviate buyer's remorse. As more time has lapsed, a customer may be less likely to have buyer's remorse. Alternatively, for other customer's buyer's remorse may increase with time. Thus, the amount of the price reduction can decrease or increase as the time lapse since purchase increases. The price reduction after purchase can also be based on the customer type. FIG. 3 shows a set of graphs illustrating how certain customer types may have certain price reduction curves (e.g., the recommended reduction in price based on the elapsed time since purchase. For example, graph 305 illustrates line 310, which indicates that customer 1 has a relatively linear relationship between the time elapsed since purchase and the price reduction needed to alleviate buyer's remorse. In contrast, graph 315 illustrates curve 320, which indicates that customer 2 has a non-linear relationship between the time elapsed since purchase and the price reduction needed to alleviate buyer's remorse. As time elapses, the exemplary system, method, and computer-accessible medium can determine if an action needs to be taken in order to alleviate the buyer's remorse before the customer returns the item. The action can include the automatic reduction in price as well as a notification to the customer of the price reduction and the amount of reduction.

If the action recommended is a reduction in price, the customer can be notified of the recommended action (e.g., through text messaging, email, phone call, etc.), and provided with an opportunity to accept the action, which can include certain consequences. For example, if the standard return period for a store is 30 days, the recommended reduction in price can be predicated on a reduction of the return period. The reduction of the return period can be a partial reduction (e.g., from 30 days to a number less than 30) or the reduction of the return period can be a complete reduction (e.g., if the customer accepts the price reduction, the item can no longer be returned).

Instead of a reduction in price, the recommended action can be a gift card or store credit to the store. If the recommended action is a reduction in price, then the store loses the amount of the reduction (although the loss from the reduction may be preferable to the return of the item).

However, if a gift card or store credit is provided, then the loss will be less, and the store credit or gift card can even drive additional sales to the store. The exemplary system, method, and computer-accessible medium can determine the recommended action (e.g., a refund or a store credit) based on the customer information and/or the item information. For example, certain customers may respond well to store credits, whereas other customers may only respond to price reductions. Additionally, the type of item can affect whether or not a store credit will be effective. In particular, certain items have ancillary items that can be purchased or used with the item. For example, if the item is a video game console, the customer is likely to purchase accessories or video games in the future. Thus, in such a case, a store credit may be as effective as a price reduction as the customer may intend to purchase the ancillary items in the future anyway.

Various customer information can be used to determine whether or not a customer is likely to have buyer's remorse, and how the customer will respond to a particular recommended action. The customer information can include, but it not limited to, gender, sexual orientation, height, weight, job type, income level, address, telephone number, prior purchase history, credit history, etc. This information can be aggregated, and a machine learning model can be generated, which can be used by the exemplary system, method, and computer-accessible medium to determine whether or not the customer is likely to have buyer's remorse, and a recommended action.

While a long return time can be based on the item itself, and can indicate a defect in the item or buyer's remorse, a short return time can indicate a problem with the price of the item itself. A short return time can occur within minutes of the customer purchasing the item (e.g., 1 minute, 5 minutes, 10 minutes, 30 minutes, 60 minutes, etc.) or within hours of the customer purchasing the item (e.g., 1 hour, 2 hours, 5 hours, etc.). For example, one problem can be that the item rang up incorrectly. The customer may not have become aware of the problem until after they purchased the item. They then will have to go to the return area (e.g., customer service) of the store to obtain a price adjustment to the correct price. If multiple customers proceed to the customer service department within a short period of time after the purchase of the item, this can indicate that the price at the point of sale does not match the correct price, or does not match the price displayed on the item itself (e.g., on the item packaging or on a shelf where the item was located). The exemplary system, method, and computer-accessible medium can then inform an employee of the store of the potential issue. The employee can then determine if the price on the item (e.g., on the item packaging or on the shelf where the item was located) is correct but the price being rung up at the point of the sale is incorrect or if the price at the point of the sale is correct, but the price on the item itself is incorrect. Either scenario can lead to cart abandonment (e.g., a return of the item by the customer). In order to prevent the customer from returning the item, the exemplary system, method, and computer-accessible medium can recommend an action be taken with respect to the customer (e.g., a price reduction or a store credit as described above).

The exemplary system, method, and computer-accessible medium can update the price at the point of sale (e.g., either temporarily or permanently) based on the detected abandonment. For example, if the price at the point of sale is correct, but the price on the item itself is incorrect (e.g., lower), then the exemplary system, method, and computer-accessible medium can temporarily lower the price at the point of sale to match the incorrect price on the item itself to ensure that a customer does not return the item. The price can be adjusted again after an indication is received that the price on the item itself has been corrected. If the price at the point of sale is incorrect, then the exemplary system, method, and computer-accessible medium can permanently correct the price at the point of sale.

A short return time can also indicate that a customer found the item cheaper at a competitor. For example, after a customer purchases an item, it is common for the customer to determine if they obtained the best price for the item. To do this, they may review the price at a competitor. If they determine that the price is cheaper at a competitor, then the customer will likely go to customer service at the merchant to either return the item or attempt to obtain a partial refund based on the price at the competitor. If customers consistently match prices with a particular competitor, then the merchant may be in danger of losing the customer to the competitor. Thus, the exemplary system, method, and computer-accessible medium can determine cart abandonment based on competitor pricing, and automatically adjust the price of an item based on the competitor. The price of the item can be adjusted at the item location (e.g., on the item packaging or at the location where the item is located for sale). The price can also only be updated at the point of sale, and only for particular customers. For example, certain customer types may be more likely to check competitor pricing than other customer types. The exemplary system, method, and computer-accessible medium can determine if a particular customer is more or less likely to check the price at a competitor after the purchase. If the customer is more likely to check the price at a competitor after purchase, then the exemplary system, method, and computer-accessible medium can proactively adjust the price at the point of sale. A notification can then be provided to the customer, at the point of sale, that the price was automatically reduced to match competitor pricing. Additionally, the customer can be notified of the competitor that the price was matched with. The notification can also include the merchant whose price was matched. By proactively adjusting the price prior to purchase, the exemplary system, method, and computer-accessible medium can dissuade a customer from checking competitor pricing after purchase. Automatically adjusting the price can also garner good will with the customer, as the customer will appreciate that the merchant is automatically determining the best price for the item and providing that price to the customer.

The exemplary system, method, and computer-accessible medium can also initiate price reductions based on competitor pricing by using information provided by a customer through an application associated with the store. Normally, to obtain a price match based on competitor pricing, the customer needs to return to the store to show proof of the price at the competitor. However, it can be onerous for a customer to return to the store. As an alternative, using a computer or a mobile device, the customer can initiate the price match process. The customer can obtain proof of the price at the competitor (e.g., a picture of the price) and submit the price match request, along with the proof, using the computer or mobile device. The price match request can be manually reviewed by an employee, and automatically initiated. Alternatively, the price match can be performed automatically by the exemplary system, method, and computer-accessible medium. For example, the exemplary system, method, and computer-accessible medium can review the proof of competitor pricing, extract the information regarding the price, compare it to the price paid by the customer, and price match if the price at the competitor is lower. The exemplary system, method, and computer-accessible medium can also independently review the competitor price to determine if the proof provided by the customer is accurate. If it is, the exemplary system, method, and computer-accessible medium can automatically match the competitor price.

Exemplary Obtaining of Competitor Prices

The exemplary system, method, and computer-accessible medium can maintain a database of competitors, and the pricing of items at each competitor. The database can include a list of some or all of the items at the store, and the price of each item at a competitor. The competitor can be a local competitor (e.g., based on geography) or the competitor can be an e-commerce competitor (e.g., a competitor that only operates a store on the internet), or both. Information can be manually entered into the database by one or more employees. However, this can be a time-consuming process. Alternatively, the exemplary system, method, and computer-accessible medium can automatically obtain the pricing information at the competitors. In particular, the exemplary system, method, and computer-accessible medium can scrape the information from competitor's websites.

Web scraping, also referred to as Screen Scraping, Web Data Extraction, Web Harvesting etc., is a technique employed to extract large amounts of data from websites whereby the data is extracted and saved to a local file in a computer or to a database. Data displayed by most websites can only be viewed using a web browser. They do not offer the functionality to save a copy of this data for personal use. Web scraping can automate the process of obtaining the information, so instead of manually copying the data from websites, the Web Scraping software can perform the same task within a fraction of the time. The exemplary system, method, and computer-accessible medium can utilize web scraping to automatically load and extract data from multiple pages of websites. It can be custom built for a specific website or it can be configured to work with any website.

The database that contains competitor pricing can be periodically updated based on how often the competitor updates their pricing (e.g., based on a sales cycle). For example, some stores update their prices once a week, and some stores update their prices at other intervals (e.g., once a month). The exemplary system, method, and computer-accessible medium can keep track of how often a competitor updates their pricing, and on what day the pricing is updated. The exemplary system, method, and computer-accessible medium can then automatically update the database based on the updated pricing information from the competitor. The database can also include historical pricing information.

Exemplary Multi-Store Aggregation

The exemplary system, method, and computer-accessible medium can utilize information at a single store to remediate in-person cart abandonment at that particular store. Additionally, the information obtained at one store can be used at another store. For example, related stores (e.g., stores owned by a single merchant) tend to use the same computer system that can be automatically updated at the same time. Thus, an incorrect price at the point of sale at one store can indicate an incorrect price at the point of sale at another store. When the exemplary system, method, and computer-accessible medium detects an incorrect price at one store, it can automatically update all points of sale at that store, and it can propagate a change to the points of sale at some or all other stores. The area of propagation can depend on how stores are grouped together. For example, stores owned by a single merchant that are within a predetermined geographic area may all have the same prices. However, stores in different geographic areas may have different prices. Thus, when the exemplary system, method, and computer-accessible medium determines that a price change needs to be propagated to other stores, the exemplary system, method, and computer-accessible medium can determine which stores are related to one another, and only propagate the price change to related stores.

In addition to using the information obtained for one store at another store, information can be aggregated across multiple stores (e.g., within the same geographic area or not within the same geographic area). For example, a particular number of data points may be needed in order to determine the reason for the cart abandonment. However, a single store, on its own, may not generate the number of data points needed. In order to obtain the needed number of data points, the exemplary system, method, and computer-accessible medium can aggregate information across multiple stores, searching for particular common patterns. This information can then be centralized and analyzed to determine where cart abandonment is occurring, as well as determining actions to be taken to remediate the card abandonment.

Exemplary Employee Provided Information

Figure 4:
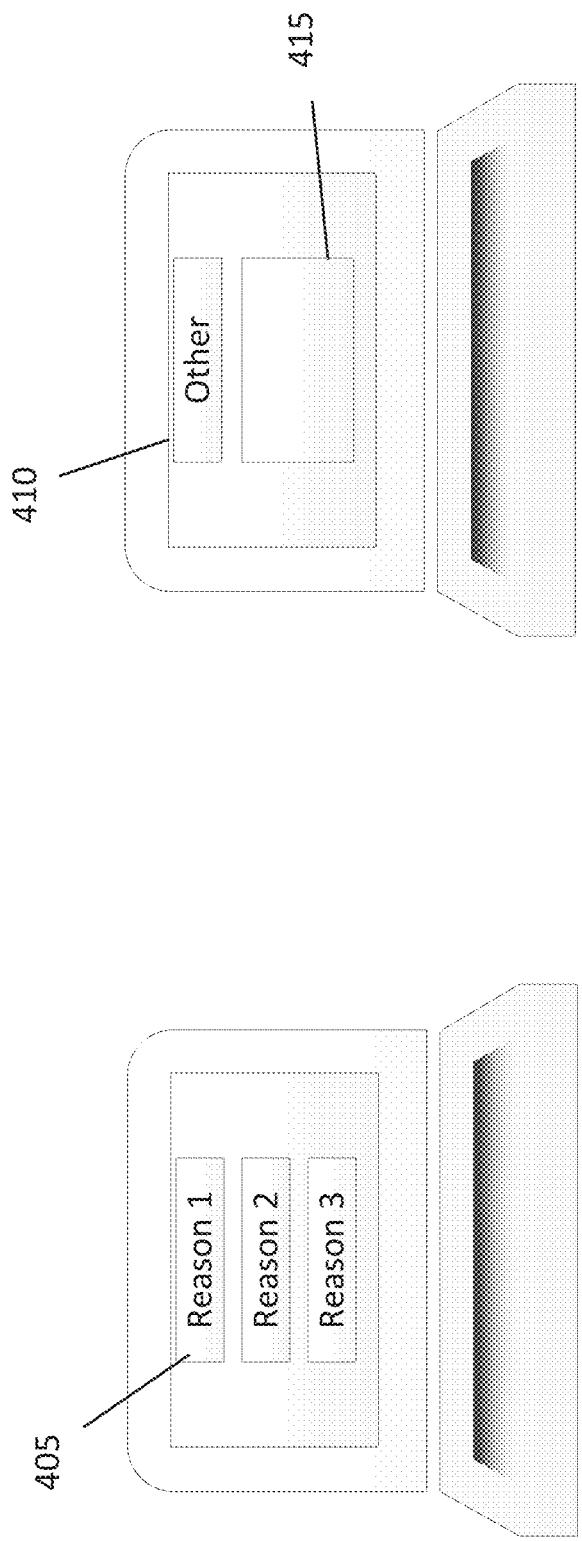
FIG. 4 is an exemplary diagram illustrating providing a reason for return according to an exemplary embodiment of the present disclosure.

When an item is voided from a transaction while the transaction takes place, or when an item is returned, an employee of the store can enter in information regarding the reason for the void or return. As shown in FIG. 4, when an employee returns an item, they can pick from a prepopulated list of reasons 405 for the return. This information can be aggregated to determine if one reason for the return is more prevalent than other reasons, which can provide an indication for the cart abandonment. For example, if the reason for return is competitor pricing, this information can be used by the store to adjust the pricing, and the recommended action can be to reduce the price of the item. However, it can be possible for employees to just enter a random reason for the return (e.g., without consulting the customer returning the item) or just select the first reason in the list of reasons. This information can indicate a problem with the item, but also a problem with the employee. Thus, the recommended action can be to first retrain employees, and then determine the reason for abandonment.

In addition to the list of prepopulated reasons for the return, an employee can select other reason 410, and add an actual description from the return. The employee can ask the customer for the reason for the return, and then input the description for the reason for the return into text box 415. Exemplary artificial intelligence and machine learning procedures can be used to analyze the descriptions provided in text box 415 to determine if a pattern exists in the reasons for return.

Exemplary Self-Checkout

Many stores today have integrated self-checkout kiosks in addition to standard checkout kiosks. The self-checkout kiosk allows the customer to checkout without the aid of a store employee. However, it is common for the customer to require an employee to remove or void an item from a transaction. The exemplary system, method, and computer-accessible medium can keep track of how often employees are needed to remove an item, and what items are removed more frequently than others. The employee can also enter a reason for removing or voiding the item, as discussed above. This information can then be used to determine the reason or reasons for the cart abandonment (e.g., the reason for voiding the item from the transaction).

If the customer has to wait too long until a store employee voids the item, or if the customer needs help from an employee, but the employee takes too long to help them, the customer may completely abandon the transaction. In such a scenario, it may not be a single item that caused the abandonment, as the customer would have completed the transaction but for the employee taking too long to help. The exemplary system, method, and computer-accessible medium can use information regarding customers completely abandoning transactions to determine the reason for cart abandonment. For example, the exemplary system, method, and computer-accessible medium can analyze pertinent store information at the time the customer abandons the transaction to identify patterns or issues that may have caused the abandonment. For instance, if complete abandonment occurs when a particular employee is monitoring the self-checkout kiosks, then the abandonment may be because of the employee, and the employee may need to be retrained. Other pertinent information can include, staffing levels, what employees are currently working, number of transaction per hour, the amount of time elapsed between when employee help is requested and when the employee actually helps the customer, etc.

Exemplary Video Tracking

Video tracking is the process of locating a moving object, or multiple objects, over time using a camera. When tracking planar objects, the motion model can be a two-dimensional ("2D") transformation (e.g., affine transformation or homography) of an image of the object (e.g. the initial frame). When the target is a rigid three-dimensional ("3D") object, the motion model can define its aspect depending on its 3D position and orientation. For video compression, key frames can be divided into macroblocks. The motion model can be a disruption of a key frame, where each macroblock can be translated by a motion vector given by the motion parameters. The image of deformable objects can be covered with a mesh, and the motion of the object can be defined by the position of the nodes of the mesh.

To perform video tracking, a procedure can be used by the exemplary system, method, and computer-accessible medium to analyze sequential video frames and output the movement of targets between the frames. For example, target representation and localization can be used for identifying the moving object. Kernel-based tracking can be employed, which is an iterative localization procedure based on the maximization of a similarity measure. Contour tracking can also be utilized, which can detect object boundaries (e.g. active contours or Condensation algorithm).

Prior information can be utilized to aid in video tracking, which can include prior information about the scene or object, and dealing with object dynamics. A recursive Bayesian filter for linear functions subjected to Gaussian noise can be incorporated, which can use a series of measurements observed over time, containing noise (e.g., random variations) and other inaccuracies, and produce estimates of unknown variables that tend to be more precise than those based on a single measurement alone. Particle filter can also be used for sampling the underlying state-space distribution of nonlinear and non-Gaussian processes.

Using the exemplary video tracking procedures described above, the exemplary system, method, and computer-accessible medium can track multiple customers in the store and determine behavior patterns, and reasons for cart abandonment. For example, video tracking can determine that a customer picked up an item and put it back down. It can track how long the customer held the item before placing it back down, as well as what part of the packaging of the item was being observed by the customer. The exemplary system, method, and computer-accessible medium can also determine if the customer put the item back in the same place that they picked it up from. If the customer only held an item for a short period of time, and put the item back in the same place they picked it up, this may not indicate a cart abandonment, as it can be likely that the customer was not going to purchase the item. However, if using video tracking it was determined that the customer put the item in their shopping cart, but ultimately did not purchase the item, then this can indicate a cart abandonment. The type of abandonment can be based on the point at which the video tracking determined that the customer is not going to purchase the item. For example, if the customer put the item in their cart, and then placed it on a shelf at a different location where they picked the item up, this can indicate one type of abandonment. However, if the video tracking determined that the item was in the customer's cart, but was then removed at the checkout counter, then this can indicate a different type of abandonment.

Video tracking can also be used to determine the types of items that are being picked up and put back down, as well as the types of items that customers are examining. The exemplary system, method, and computer-accessible medium can keep track of the location of the customer to determine what item or items they are looking at, and how long they were looking at each item. If the customer only examined an item for a short period of time, then it may be likely that they never intended to purchase the item. However, if the customer examined the item for a long period of time, but did not purchase the item, then this can indicate cart abandonment. The exemplary system, method, and computer-accessible medium can analyze purchase information for a particular period of time after a customer examines an item to determine if a transaction took place that included the item. The exemplary system, method, and computer-accessible medium can match the person that looked at the item to a video feed of a checkout counter where the transaction took place to determine if it is the same person who examined the item.

The exemplary system, method, and computer-accessible medium can also use video tracking to determine customer behavior when they examine an item. For example, the exemplary system, method, and computer-accessible medium can determine that when examining an item, the customer took out their mobile device. Video tracking can also be used to determine how long the customer looked at their mobile device, as well as if the customer kept looking at their mobile device and then at the item, and then back at their mobile device to help determine cart abandonment. The exemplary system, method, and computer-accessible medium can use this information to determine that the customer more than likely checked the price of the item at one or more competitors. Information regarding the number of times a person pulled out their mobile device (e.g., while looking at a particular item) can also be used to help determine cart abandonment. This, information can be compared to the usage of a store's application (e.g., as described with reference to FIG. 5) to determine if the customer is looking up reviews of the item.

If the exemplary system, method, and computer-accessible medium determines that the customer found the item cheaper at a competitor, and thus does not put the item in their shopping cart, the exemplary system, method, and computer-accessible medium can provide a notification to the customer that they will price match to the competitor. This can be performed by sending a notification to a mobile device associated with the customer, or electronic pricing at the shelf can be adjusted automatically, with an indication of the price adjustment (e.g., a visual or audible notification directing the customer's attention to the price change). Additionally, the exemplary system, method, and computer-accessible medium can determine if the customer looked up reviews of the item, and then ultimately did not purchase the item. The video tracking can be used to determine where the customer looked up the reviews. The exemplary system, method, and computer-accessible medium can then automatically analyze the reviews seen by the customer to determine any problems with the item that may cause cart abandonment.

The exemplary system, method, and computer-accessible medium can utilize a map of the store to aid in tracking of customers. The map can include the location of each item in the store and the corresponding correct price. The exemplary system, method, and computer-accessible medium can compare the correct price of each item with the price actually displayed at the item location using a video feed of the item location. If the prices do not match, the exemplary system, method, and computer-accessible medium can send a notification to an employee to change the price at the item location, if the price is a physical price. If digital pricing is employed (e.g., where the price tag for each item is displayed digitally), then the exemplary system, method, and computer-accessible medium can automatically adjust the price at the item location. The exemplary system, method, and computer-accessible medium can also automatically determine the displayed price for an item based on feedback from a customer during checkout. For example, during checkout, an item may be priced differently than what was expected by the customer. The customer can provide an indication that the price is incorrect (e.g., by telling the employee checking out the customer or through a self-checkout kiosk). The exemplary system, method, and computer-accessible medium can utilize the map of each item in the store to determine the location of the item at issue. A video feed can be automatically accessed, and the price displayed at the item location can be determined. The price at the checkout can then be automatically adjusted for the customer.

Exemplary Mobile Device Tracking

Figure 5:
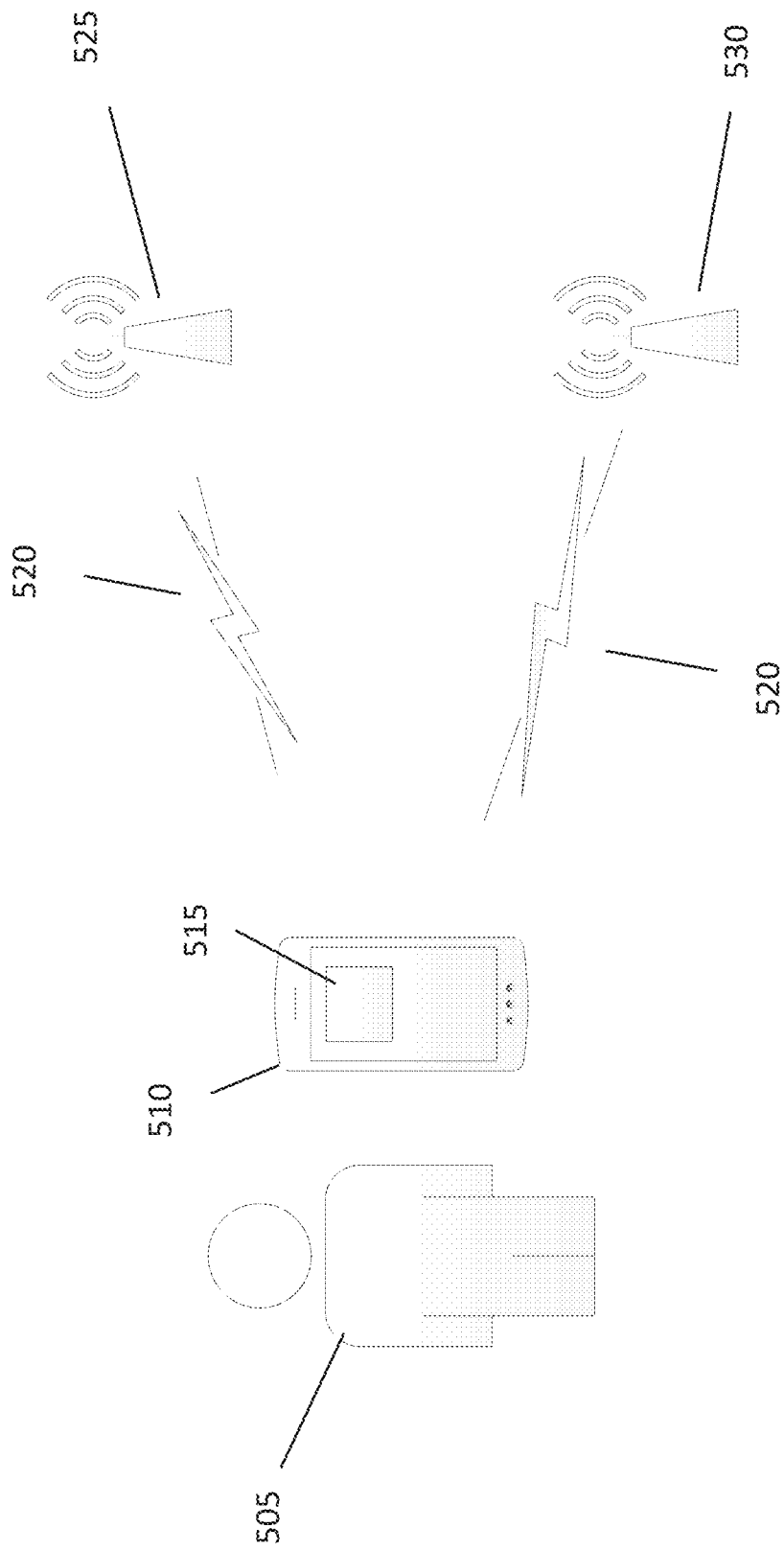
FIG. 5 is an exemplary diagram illustrating mobile device tracking according to an exemplary embodiment of the present disclosure.

FIG. 5 shows an exemplary diagram of mobile device tracking in a store according to an exemplary embodiment of the present disclosure. For example, as shown therein, a customer 505 can have a mobile device 510. Mobile device 510 can include an application 515 stored thereon. Application 515 can be an application associated with a particular store, and it can be used by customer 505 in the store. Mobile device 510 can connect to one or more access points 525 and 530 through a wireless network connection 520 (e.g., a Wi-Fi connection). Using access points 525 and 530, the exemplary system, method, and computer-accessible medium can track the location of the customer in the store, including what aisles they are shopping in, and whether they remain in a particular store section for a particular amount of time. Information about the usage of application 515 by customer 505 while in the store can also be used to determine customer 505's behavior and why they abandoned an item. For example, if a customer examines reviews of an item on application 515, but does not buy the item, this can indicate a certain type of cart abandonment. The combination of mobile device tracking, and video tracking, can be used to incentivize customers not to abandon items. For example, application 515 can be used to provide a notification to customer 505 of a price reduction to incentivize customer 505 to buy an item.

Exemplary Facial Recognition

The exemplary system, method, and computer-accessible medium can utilize facial recognition to identify customers in a store using video or still images in order to track the customer (e.g., as described herein). Various suitable facial recognition technologies can be used. For example, the exemplary system, method, and computer-accessible medium can identify facial features by extracting landmarks, or features, from an image or video of the subject's face. For example, a procedure may analyze the relative position, size, and/or shape of the eyes, nose, cheekbones, and jaw. These features can then be used to search for other images or videos with matching features. Additionally, a gallery of face images can be normalized and the face data can be compressed, only saving the data in the image that is useful for face recognition. A probe image or video can then be compared with the face data.

Other facial recognition procedures can be incorporated. For example, geometric recognition can be utilized, which looks at distinguishing features. Additionally, photometric recognition can be utilized, which is a statistical approach that distills an image or video into values and compares the values with templates to eliminate variances. The facial recognition utilized by the exemplary system, method, and computer-accessible medium can include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

3D facial recognition can also be utilized. 3D facial recognition uses 3D sensors to capture information about the shape of a face. This information can then be used to identify distinctive features on the surface of a face, such as the contour of the eye sockets, nose, and chin. An advantage of 3D face recognition can be that it is not affected by changes in lighting like other techniques. It can also identify a face from a range of viewing angles, including a profile view. 3D data points from a face can vastly improve the precision of face recognition. 3D facial recognition can be enhanced using sophisticated sensors for capturing 3D face imagery. The sensors can function by projecting structured light onto the face of the customer. Video feeds from one or more camera can be used for facial recognition. For example, thermal cameras can be used to detect the shape of the head. Unlike conventional cameras, thermal cameras can capture facial imagery even in low-light and nighttime conditions without using a flash and exposing the position of the camera.

Exemplary Pattern Recognition

Pattern recognition is the process of recognizing patterns, for example, by using machine learning algorithm. Pattern recognition can be defined as the classification of data based on knowledge already gained or on statistical information extracted from patterns and/or their representation. In a typical pattern recognition application, the raw data is processed and converted into a form that is amenable for a machine to use. Pattern recognition can include classification and cluster of patterns. In classification, an appropriate class label can be assigned to a pattern based on an abstraction that can be generated using a set of training patterns or domain knowledge. Clustering can be generated a partition of the data, which can aid in decision making.

Features may be represented as continuous, discrete, or discrete binary variables. A feature is a function of one or more measurements, computed so that it quantifies some significant characteristics of the object. A set of features that are taken together forms the features vector. A Feature vector is the sequence of a features represented as a d-dimensional column vector. The exemplary system, method, and computer-accessible medium can also employ a database counter to keep track of particular cart abandonments.

Exemplary Machine Learning

As discussed above, the exemplary system, method, and computer-accessible medium can utilize machine learning to determine cart abandonment. The exemplary machine learning can utilize information related to previous abandonment by other customers, and various exemplary models can be generated (e.g., for different types of cart abandonment or for different recommended actions). The exemplary system, method, and computer-accessible medium can then apply the generated models to determine the reason for a cart abandonment, or the recommended action to take to prevent cart abandonment. The exemplary model generated can factor in information about returns, exchanges, voided items, scanned items that are not purchased, etc.

The exemplary system, method, and computer-accessible medium can utilize various neural network, such as convolutional neural networks ("CNN") or recurrent neural networks ("RNN") to generate the exemplary models. A CNN can include one or more convolutional layers (e.g., often with a subsampling step) and then followed by one or more fully connected layers as in a standard multilayer neural network. CNNS can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

Figure 6:
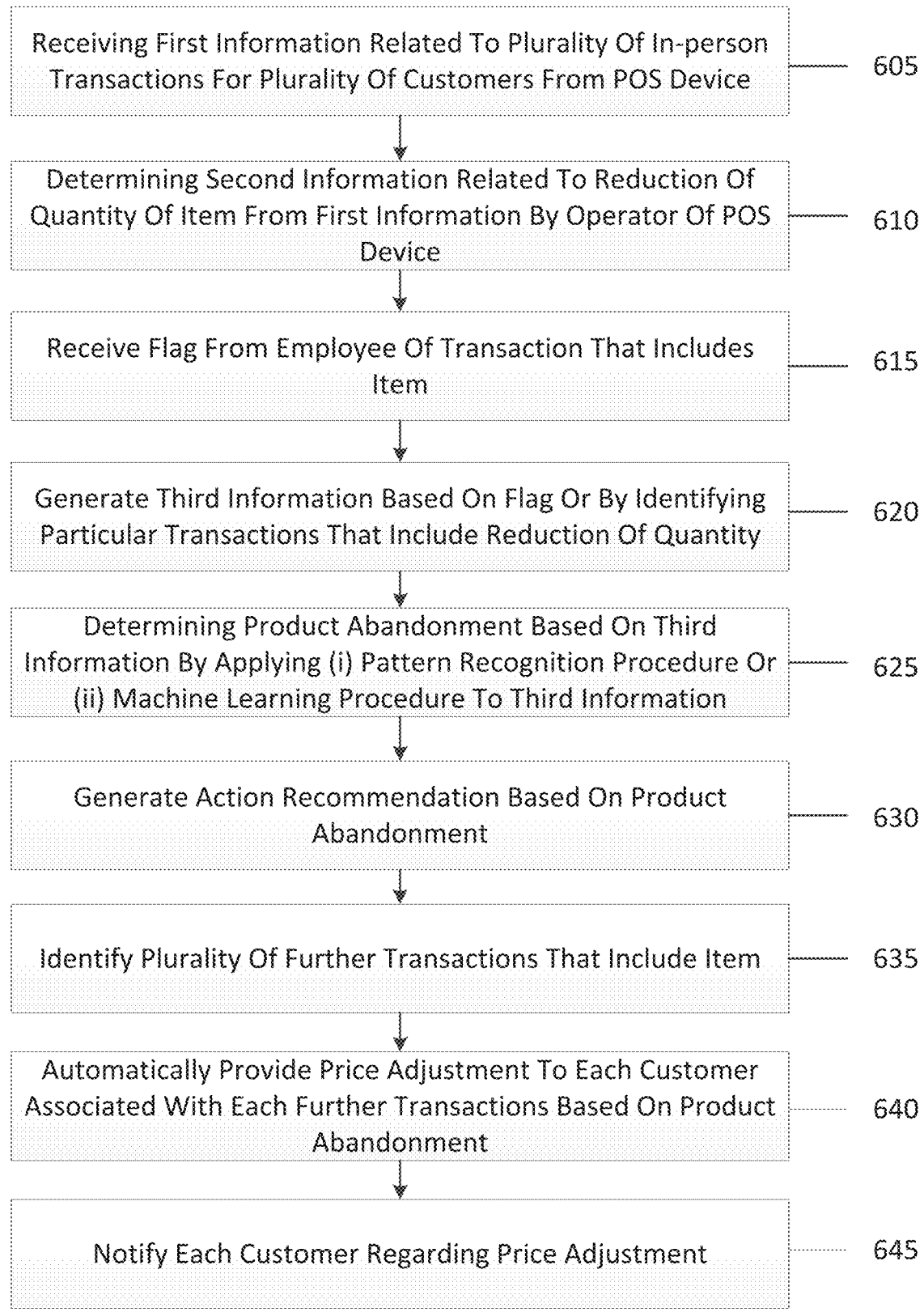
FIGS. 6, 7A, and 7B are exemplary flow diagrams of methods for determine produce abandonment according to an exemplary embodiment of the present disclosure.

FIG. 6 is a flow diagram of a method 600 for determining product abandonment for an item according to an exemplary embodiment of the present disclosure. For example, at procedure 605, first information related to a plurality of in-person transactions for a plurality of customers from a point of sale (POS) device can be received. The information can be from a single store, or multiple related stores. At procedure 610, second information related to a reduction of a quantity of the item can be determined from the first information by an operator of the POS device. This information can also be from a single store or from multiple related stores. At procedure 615, a flag can be received from an employee of a transaction that includes the item. The flag can be during a return of the item, or while a transaction that includes the item occurs. At procedure 620, third information can be generated based on the flag or by identifying particular transactions that include the reduction of the quantity. At procedure 625, the product abandonment can be determined based on the third information by applying (i) a pattern recognition procedure or (ii) a machine learning procedure to the third information. At procedure 630, an action recommendation can be generated based on the product abandonment. Actions can include reducing the price of an item, providing a customer with a store credit, retraining employees, alerting management to potential issues, etc. At procedure 635, a plurality of further transactions that include the item can be identified. At procedure 640, a price adjustment can be automatically provided to each customer associated with each of the further transactions based on the product abandonment. At procedure 645, each customer can be notified regarding the price adjustment. The notification can be through email, text message, phone call, etc.

Figure 7A:
Figure 7B:
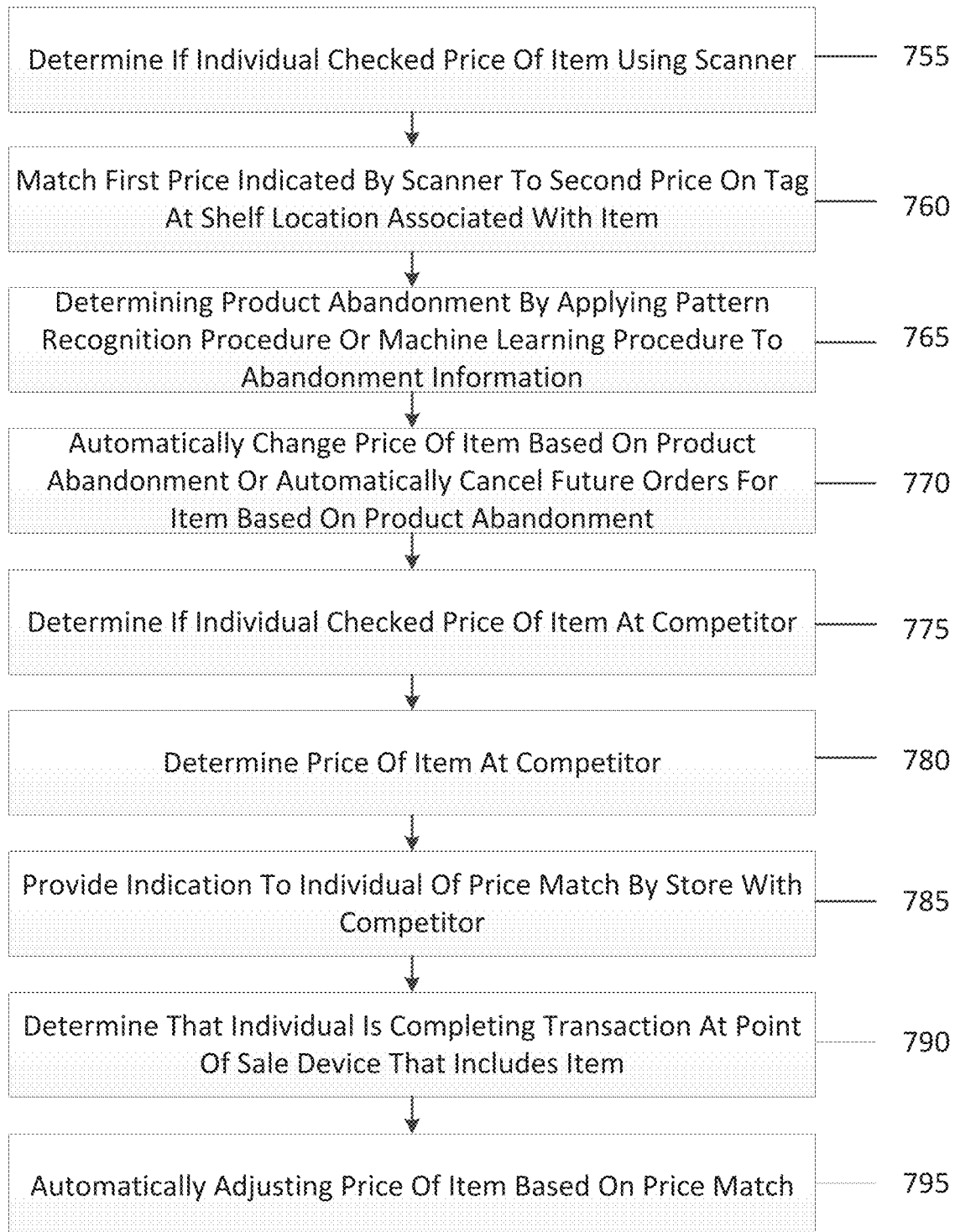

FIGS. 7A and 7B are flow diagrams of a method 700 for determining product abandonment for an item according to an exemplary embodiment of the present disclosure. For example, at procedure 705, a video feed from a camera located in a store can be received. Any suitable 2D or 3D camera can be used, include infrared cameras. The cameras can have any suitable resolution (e.g., high-definition, non-high-definition, etc.). At procedure 710, an individual in the store can be tracked using the video feed, using any suitable video tracking procedure. At procedure 715, a Wi-Fi request can be received from the individual for network access to a mobile device associated with the individual. At procedure 720, access to the mobile device to Wi-Fi associated with the store can be granted. At procedure 725, the individual can be tracked using the mobile device. Tracking can be performed by determining the location of the mobile device based on access points in the store, as well as a map of the store that includes the location of the access points. Overlapping signals between access points can also be used (e.g., is the mobile device handing off between one access point and another access point).

At procedure 730, a determination can be made as to whether the individual picked up an item based on the tracking. At procedure 735, a determination can be made as to whether the individual subsequently put down the item based on the tracking. At procedure 740, a time elapsed between when the individual picked up the item and when the individual put down the item can be determined. Whenever an individual picks up an item, a clock can be initiated, which can be stopped when the individual puts the item back down (e.g., in the same spot they picked the item up from, at a different spot, or in their cart). At procedure 745, a first location where the individual picked up the item and a second location where the individual put down the item can be determined. At procedure 750, a distance between the first location and the second location can be determined. This can be based on a scaled map of the store. At procedure 755, a determination can be made as to whether the individual checked a price of the item using a scanner. The scanner can be price check scanners placed throughout the store. At procedure 760, a first price indicated by the scanner can be matched to a second price on a tag at a shelf location associated with the item. At procedure 765, the product abandonment can be determined by applying a pattern recognition procedure or a machine learning procedure to the abandonment information.

At procedure 770, a price of the item can be automatically changed based on the product abandonment or future orders for the item can be automatically cancelled based on the product abandonment. The price change can occur by changing the price at one or more point of sale devices, as well as digital price tags located where the item is located. At procedure 775, a determination can be made as to whether the individual checked a price of the item at a competitor. This can be performed by automatically analyzing video of the customer's duration of engagement on their mobile device. At procedure 780, the price of the item at the competitor can be determined, for example, by checking a database that includes competitor pricing. At procedure 785, an indication can be provided to the individual of a price match by the store with the competitor. The indication can be provided by phone, email, text, message, by changing a digital price, or by an indication at a point of sale device. At procedure 790, a determination can be made as to whether the individual is completing a transaction at a point of sale device that includes the item. At procedure 795, the price of the item can be automatically adjusted based on the price match.

Figure 8:
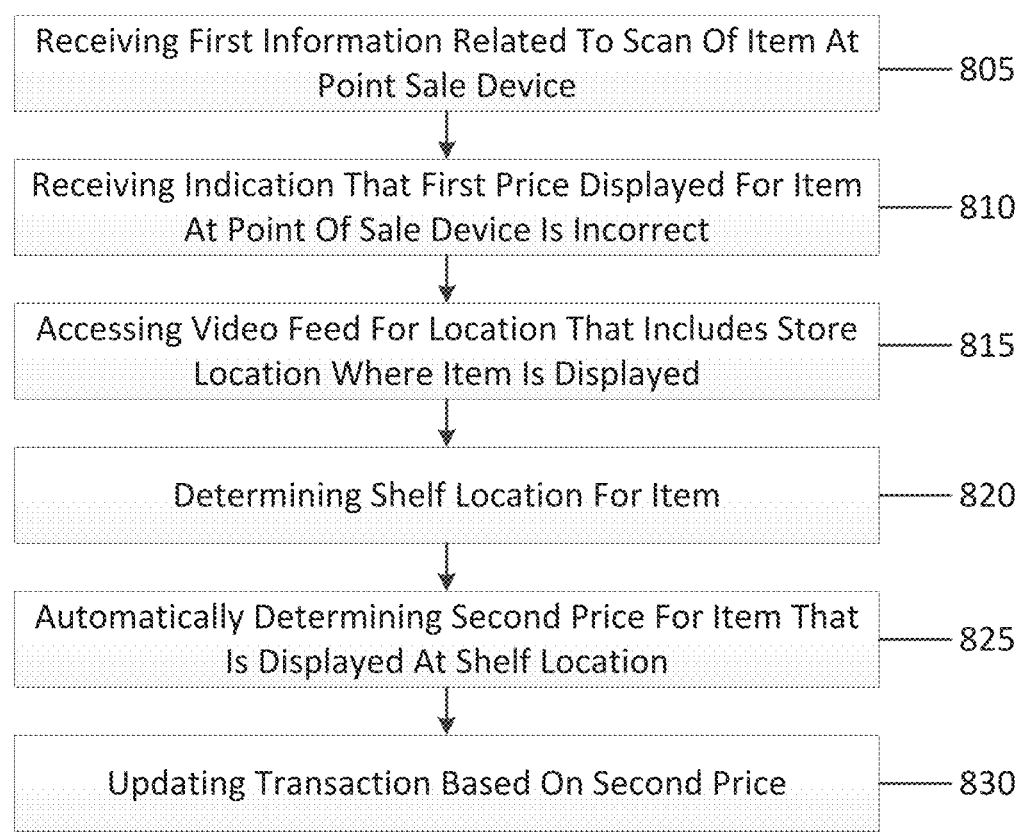
FIG. 8 is an exemplary flow diagram of a method for updating a transaction according to an exemplary embodiment of the present disclosure.

FIG. 8 is a flow diagram of a method 800 for updating a transaction according to an exemplary embodiment of the present disclosure. For example, at procedure 805, first information related to a scan of an item at a point sale device can be received. At procedure 810, an indication that a first price displayed for the item at the point of sale device is incorrect can be received. At procedure 815, a video feed for a location that includes a store location where the item is displayed can be accessed. For example, a map can be accessed which shows the location of each item. The location of the item can be determined, as well as a video camera that monitors the area where the item is located. At procedure 820, a shelf location for the item can be determined, for example, by analyzing the video camera feed. At procedure 825, a second price for the item that is displayed at the shelf location can be automatically determined. At procedure 830, the transaction can be updated based on the second price.

Figure 9:
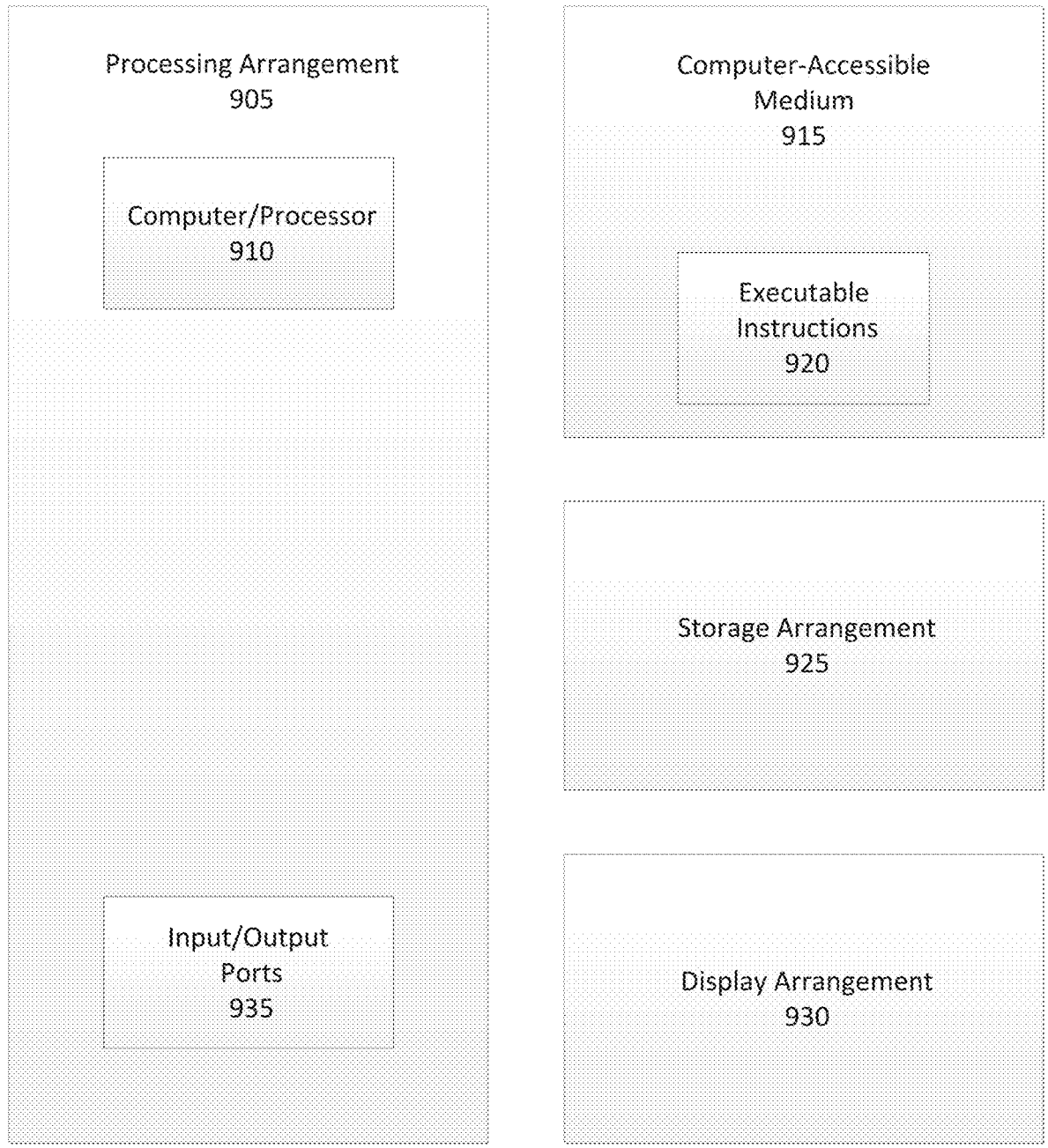
FIG. 9 is an illustration of an exemplary block diagram of an exemplary system in accordance with certain exemplary embodiments of the present disclosure.

FIG. 9 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 905. Such processing/computing arrangement 905 can be, for example entirely or a part of, or include, but not limited to, a computer/processor 910 that can include, for example one or more microprocessors, and use instructions stored on a computer-accessible medium (e.g., RAM, ROM, hard drive, or other storage device).

As shown in FIG. 9, for example a computer-accessible medium 915 (e.g., as described herein above, a storage device such as a hard disk, floppy disk, memory stick, CD-ROM, RAM, ROM, etc., or a collection thereof) can be provided (e.g., in communication with the processing/computing arrangement 905). The computer-accessible medium 915 can contain executable instructions 920 thereon. In addition or alternatively, a storage arrangement 925 can be provided separately from the computer-accessible medium 915, which can provide the instructions to the processing/computing arrangement 905 so as to configure the processing arrangement to execute certain exemplary procedures, processes, and methods, as described herein above, for example.

Further, the exemplary processing/computing arrangement 905 can be provided with or include an input/output ports 935, which can include, for example a wired network, a wireless network, the interne, an intranet, a data collection probe, a sensor, etc. As shown in FIG. 9, the exemplary processing/computing arrangement 905 can be in communication with an exemplary display arrangement 930, which, according to certain exemplary embodiments of the present disclosure, can be a touch-screen configured for inputting information to the processing arrangement in addition to outputting information from the processing arrangement, for example. Further, the exemplary display arrangement 930 and/or a storage arrangement 925 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions for determining product abandonment of at least one item, wherein, when a computer arrangement executes the instructions, the computer arrangement is configured to perform procedures comprising:
   receiving first information related to a plurality of in-person transactions for a plurality of customers from at least one point of sale (POS) device located at least one merchant, wherein the first information includes transaction information related to the at least one item;
   determining second information related to a reduction of a quantity of the at least one item from the first information by at least one operator of the at least one POS device;
   generating third information by identifying particular transactions that include the reduction of the quantity;
   receiving at least one video feed from at least one camera located in a store where the at least one POS device is located;
   tracking, using the at least one video feed, at least one individual in the store, wherein the tracking comprises: defining, using a motion model, a position and an orientation of the at least one individual in the at least one video feed; dividing key frames of the at least one video feed into macroblocks; and translating each macroblock by a motion vector given by motion parameters;
   generating at least one of (i) a pattern recognition procedure configured to determine one or more reasons for a product abandonment and (ii) a machine learning procedure configured to determine one or more reasons for a product abandonment;
   training at least one of (i) the pattern recognition procedure and (ii) the machine learning procedure over a predetermined number of sequences to determine one or more reasons for product abandonment including at least one selected from the group of a defect in the product, an incorrect price associated with the product, and a likelihood of remorse of the plurality of customers based on aggregated information associated with the items and the plurality of customers; and
   determining the one or more reasons for product abandonment based on the third information and the tracking by applying at least one of (i) the pattern recognition procedure and (ii) the machine learning procedure to the third information.

2. The computer-accessible medium of claim 1, wherein the first information includes in-person transactions that occurred over a particular period of time, and wherein the particular period of time corresponds to a sales cycle of the at least one merchant.

3. The computer-accessible medium of claim 1, wherein the reduction of the quantity is one of (i) a return of the at least one item or (ii) or a removal of the at least one item from a transaction prior to completing the transaction.

4. The computer-accessible medium of claim 3, wherein the computer arrangement is configured to generate the third information by flagging particular transactions that include the return of the at least one item where the return took place within a particular period of time after a purchase of the at least one item.

5. The computer-accessible medium of claim 4, wherein the particular period of time is less than about 60 minutes.

6. The computer-accessible medium of claim 1, wherein the computer arrangement is further configured to:
   receive a flag from at least one employee of at least one transaction that includes the at least one item; and
   generate the third information based on the flag.

7. The computer-accessible medium of claim 1, wherein the computer arrangement is further configured to generate at least one action recommendation based on the product abandonment.

8. The computer-accessible medium of claim 7, wherein the at least one action recommendation includes (i) fixing a pricing error for the at least one item, (ii) retraining at least one employee on the at least one item, (iii) decreasing a number of inventory orders for the at least one item, or (iv) identifying a product defect associated with the at least one item.

9. The computer-accessible medium of claim 1, wherein the computer arrangement is further configured to:
   identify a plurality of further transactions that include the at least one item;
   automatically provide a price adjustment to each customer associated with each of the further transactions based on the product abandonment; and
   notify each customer regarding the price adjustment.

10. The computer-accessible medium of claim 1, wherein the at least one POS device includes a plurality of POS devices located in a plurality of different stores associated with a single merchant.

11. A non-transitory computer-accessible medium having stored thereon computer-executable instructions for determining product abandonment of at least one item, wherein, when a computer arrangement executes the instructions, the computer arrangement is configured to perform procedures comprising:
   receiving at least one video feed from at least one camera located in at least one store;
   tracking at least one individual in the at least one store using the at least one video feed, wherein the tracking comprises: defining, using a motion model, a position and an orientation of the at least one individual in the at least one video feed; dividing key frames of the at least one video feed into macroblocks; and translating each macroblock by a motion vector given by motion parameters;
   determining abandonment information, wherein the determining of the abandonment information includes:
   determining if the at least one individual picked up at least one item based on the tracking;
   determining if the at least one individual subsequently put down the at least one item based on the tracking;
   determining a time elapsed between when the at least one individual picked up the at least one item and when the at least one individual put down the at least one item;
   generating either at least one of (i) a pattern recognition procedure configured to determine a product abandonment and (ii) a machine learning procedure configured to determine or more reasons for product abandonment a product abandonment;

training at least one of (i) the pattern recognition procedure and (ii) the machine learning procedure over a predetermined number of sequences to determine one or more reasons for product abandonment including at least a defect in the product, an incorrect price associated with the product, or a likelihood of remorse a plurality of customers based on aggregated information associated with the items and the plurality of customers; and determining one or more reasons for the product abandonment by applying a (i) the pattern recognition procedure and (ii) the machine learning procedure to the abandonment information.

12. The computer-accessible medium of claim 11, wherein the computer arrangement is further configured to:
determine a first location where the at least one individual picked up the at least one item and a second location where the at least one individual put down the at least one item;
determine a distance between the first location and the second location; and
determine the product abandonment based on the distance.

13. The computer-accessible medium of claim 11, wherein the computer arrangement is further configured to:
determine if the at least one individual checked a price of the at least one item using a scanner;
match a first price indicated by the scanner to a second price on a tag at a shelf location associated with the at least one item; and
determine the product abandonment based on a price difference between the first price and the second price.

14. The computer-accessible medium of claim 11, wherein the computer arrangement is further configured to:
determine if the at least one individual checked a price of the at least one item at least one competitor, while in the at least one store, using a mobile device associated with the at least one individual;
determine the price of the at least one item at the at least one competitor; and
provide an indication to the at least one individual of a price match by the at least one store with the at least one competitor.

15. The computer-accessible medium of claim 14, wherein the computer arrangement is further configured to provide the indication (i) by sending a notification to the mobile device or (ii) by changing a digital price at a shelf location associated with the at least one item while the at least one individual is near the shelf location.

16. The computer-accessible medium of claim 14, wherein the computer arrangement is further configured to:
determine that the at least one individual is completing a transaction at a point of sale device that includes the at least one item; and automatically adjusting the price of the at least one item based on the price match.

17. The computer-accessible medium of claim 11, wherein the computer arrangement is configured to track the at least one individual using facial recognition.

18. The computer-accessible medium of claim 11, wherein the computer arrangement is configured to:
receive a Wi-Fi request from the at least one individual for network access to a mobile device associated with the at least one individual;
grant access to the mobile device to Wi-Fi associated with the at least one store; and
track the at least one individual using the mobile device.

19. The computer-accessible medium of claim 11, wherein the computer arrangement is further configured to at least one of (i) automatically change a price of the at least one item based on the product abandonment or (ii) automatically cancel future orders for the at least one item based on the product abandonment.

20. A non-transitory computer-accessible medium having stored thereon computer-executable instructions for updating at least one transaction, wherein, when a computer arrangement executes the instructions, the computer arrangement is configured to perform procedures comprising:
receiving first information related to a scan of an item at a point of sale device;
receiving an indication that a first price displayed for the item at the point of sale device is incorrect;
accessing a video feed for a location that includes a store location where the item is displayed;
determining a shelf location for the item based on the video feed, wherein the determining comprises: defining, using a motion model, a position and an orientation of the shelf in the video feed; dividing key frames of the video feed into macroblocks; and translating each macroblock by a motion vector given by motion parameters;
generating at least one of (i) a pattern recognition procedure configured to determine a second price and (ii) a machine learning procedure configured to determine a second price;
training at least one of (i) the pattern recognition procedure and (ii) the machine learning procedure over a predetermined number of sequences to determine a second price;
automatically determining the second price for the item that is displayed at the shelf location, wherein the second price is determined by applying (i) the pattern recognition procedure and (ii) the machine learning procedure to the first price and the store location; and
updating the at least one transaction based on the second price.

* * * * *